United States Patent [19]

Cavin

[11] Patent Number: 5,127,980
[45] Date of Patent: Jul. 7, 1992

[54] APPARATUS FOR CONTINUOUSLY FORMING COMPOSITE MATERIAL INTO A RIGID STRUCTURAL MEMBER

[75] Inventor: Michael G. Cavin, Federal Way, Wash.

[73] Assignee: Graphite Design and Detail, Incorporated, Boulder, Colo.

[21] Appl. No.: 687,121

[22] Filed: Apr. 18, 1991

[51] Int. Cl.⁵ .................. B32B 17/04; B32B 27/04; B32B 31/04

[52] U.S. Cl. .................. 156/441; 156/180; 156/245; 156/390; 156/433; 156/498; 156/500; 156/510; 156/537; 156/583.1; 425/347; 425/407; 425/502; 425/505

[58] Field of Search .......... 156/441, 500, 180, 245, 156/498, 433, 289, 361, 390, 494, 510, 537, 583.1, 166, 359, 580, 583.7; 425/346, 347, 407, 352, 353, 406, 408, 500-502, 505

[56] References Cited

U.S. PATENT DOCUMENTS

| | | |
|---|---|---|
| 3,530,212 | 9/1970 | Kienle et al. .......... 156/180 X |
| 3,654,028 | 4/1972 | Goldsworthy .......... 156/144 X |
| 4,133,711 | 1/1979 | August et al. . |
| 4,154,634 | 5/1979 | Shobert et al. .......... 156/441 X |
| 4,200,271 | 4/1980 | August et al. . |
| 4,512,837 | 4/1985 | Sarh et al. . |
| 4,816,102 | 3/1989 | Cavin et al. . |
| 4,820,366 | 4/1989 | Beever et al. .......... 156/180 X |

Primary Examiner—Jeff H. Aftergut
Attorney, Agent, or Firm—Fields, Lewis, Pittenger & Rost

[57] ABSTRACT

The present invention contemplates a method of continuously forming a layered composite material into a rigid structure as the material is moved from an upstream location to a downstream location. The uncured layered composite material is pulled from a supply at the upstream location through a forming die to form the material into a structural member having a desired shape. The member is moved downstream into a heating die where it is at least partially cured. After it leaves the heating die it is cooled and continues to move downstream where it is cut into suitable lengths. The cooling can be accomplished by a cooling die located downstream from the heating die. A liner is provided within the dies having the same shape as the structural member through which the structural member slides as it moves in the downstream location. The movement of the structural member can be incremental so that the portion which is within the heating die can remain there for a sufficient length of time to accomplish the desired curing.

12 Claims, 5 Drawing Sheets

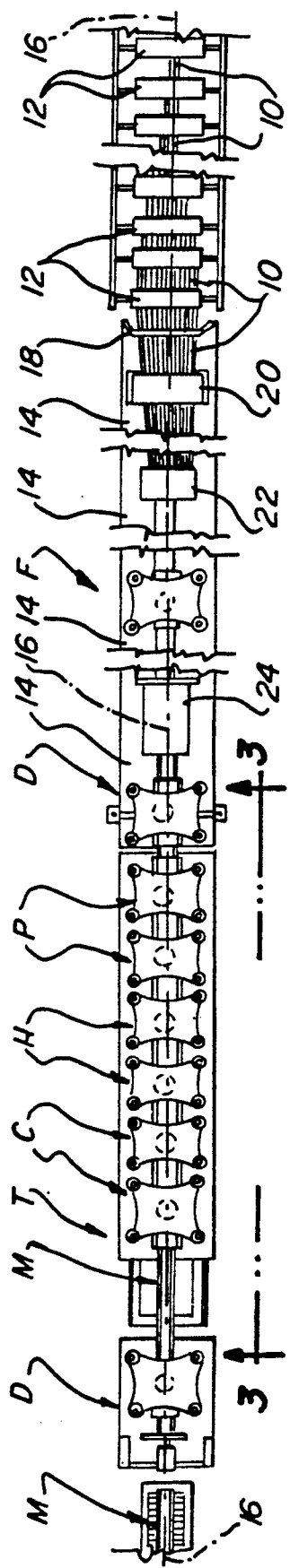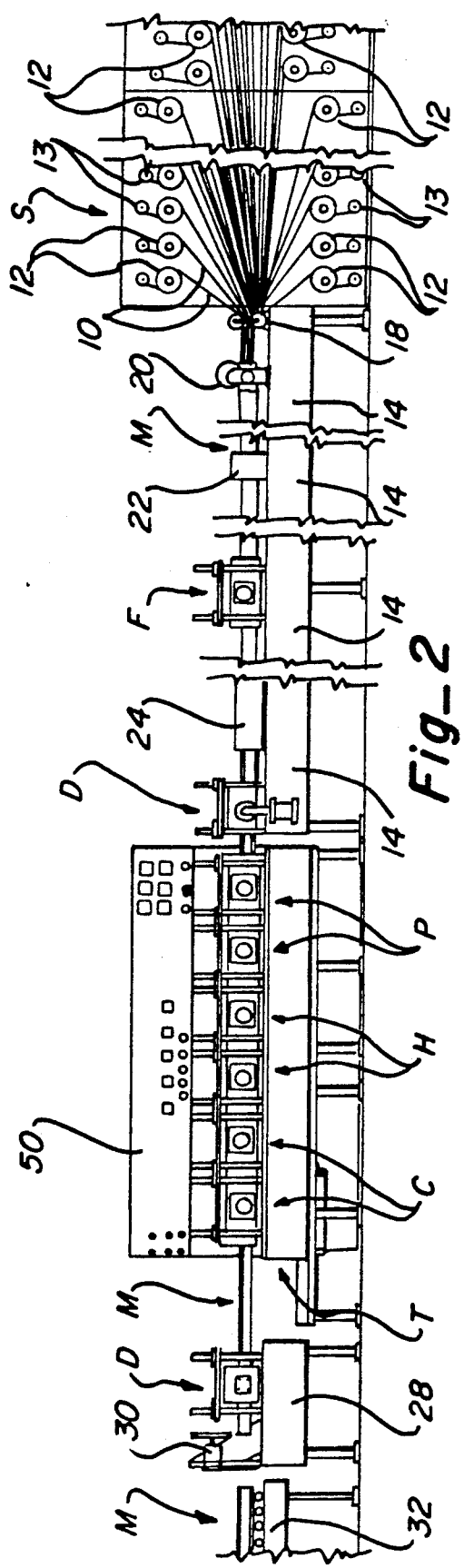

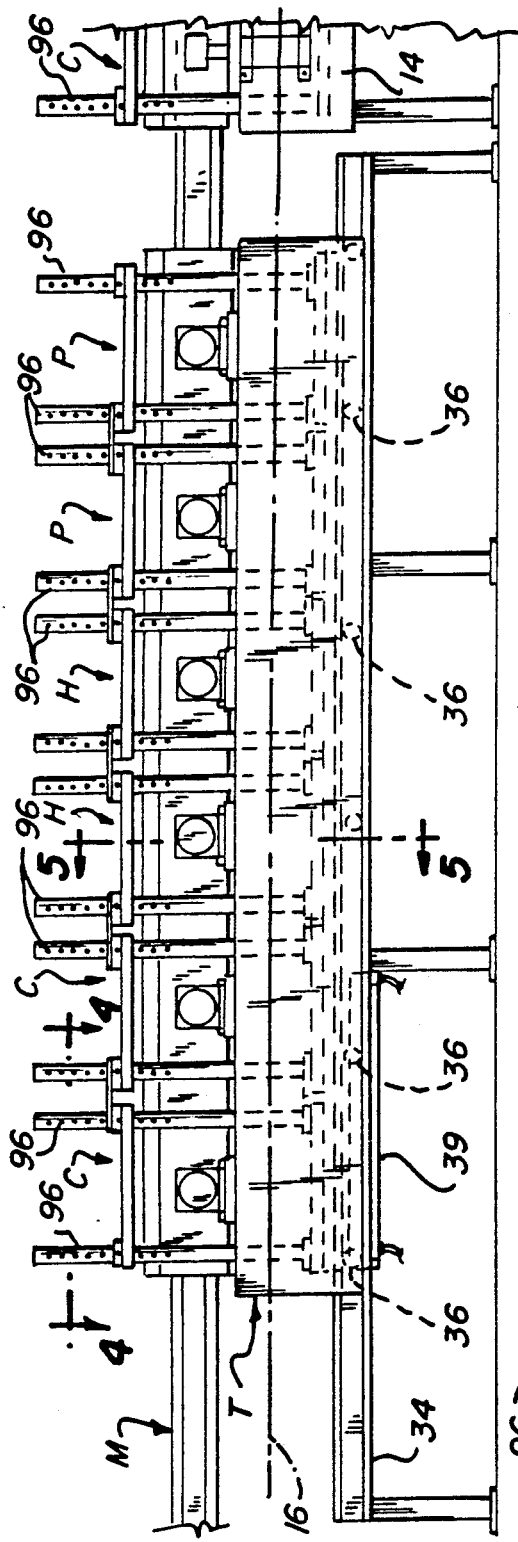
Fig_3
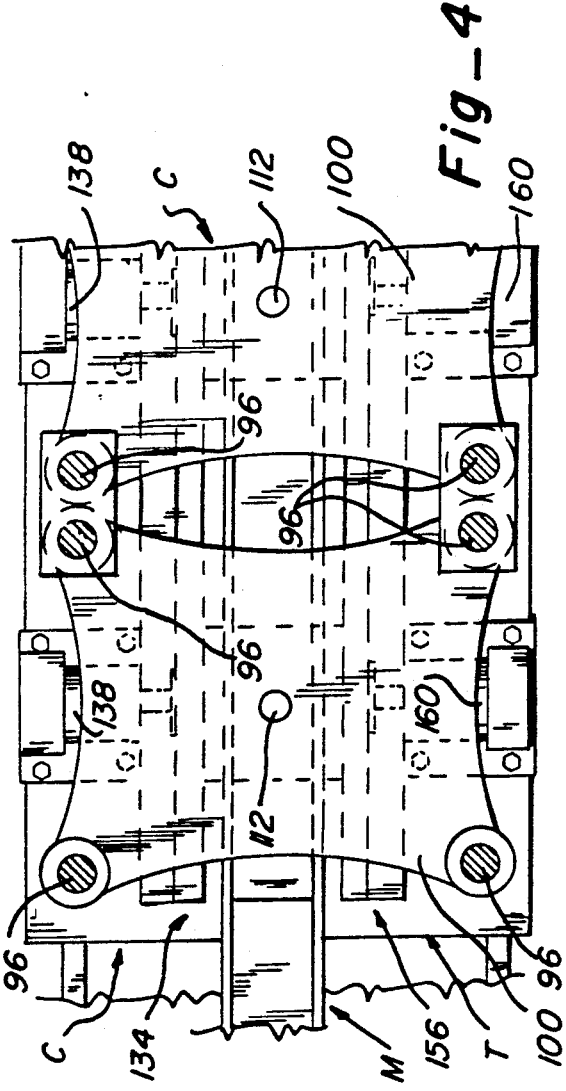
Fig_4

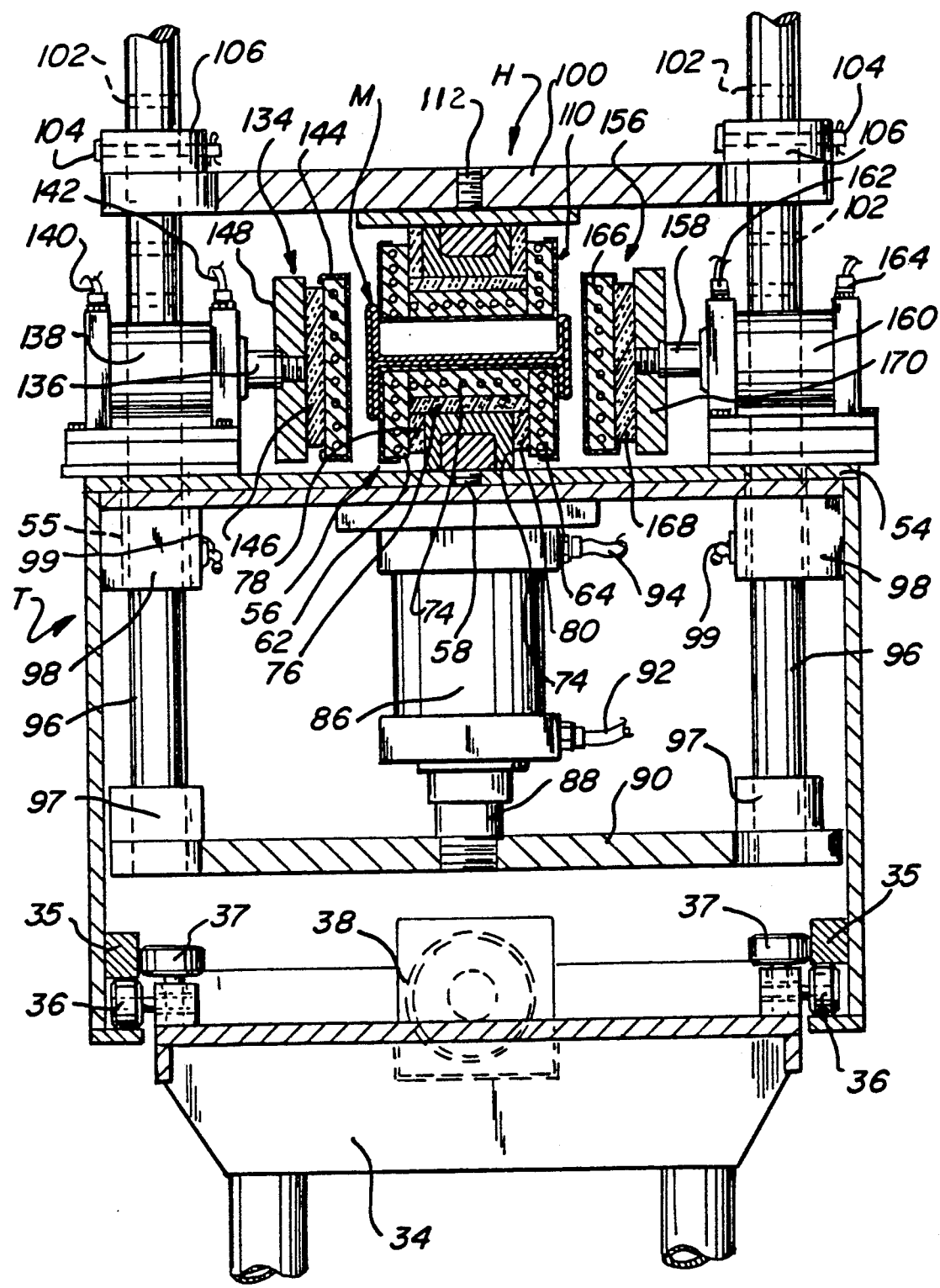
Fig_5

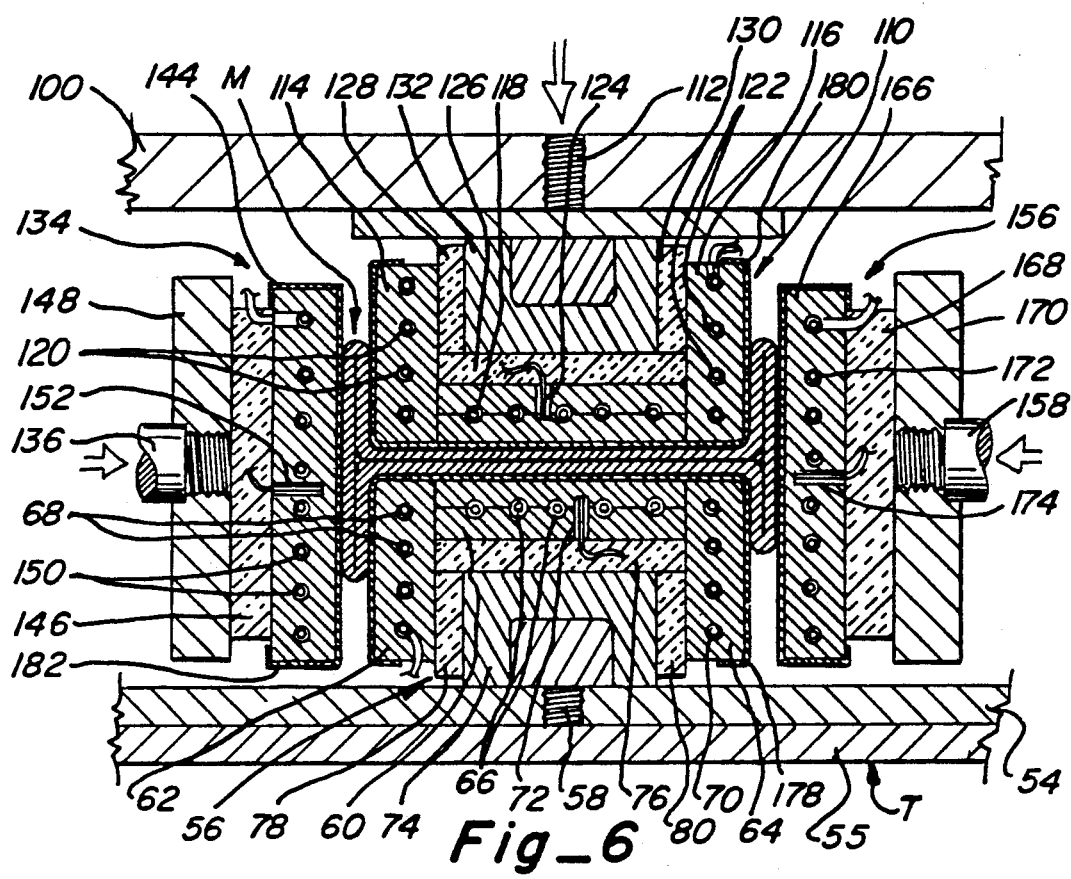
Fig_6
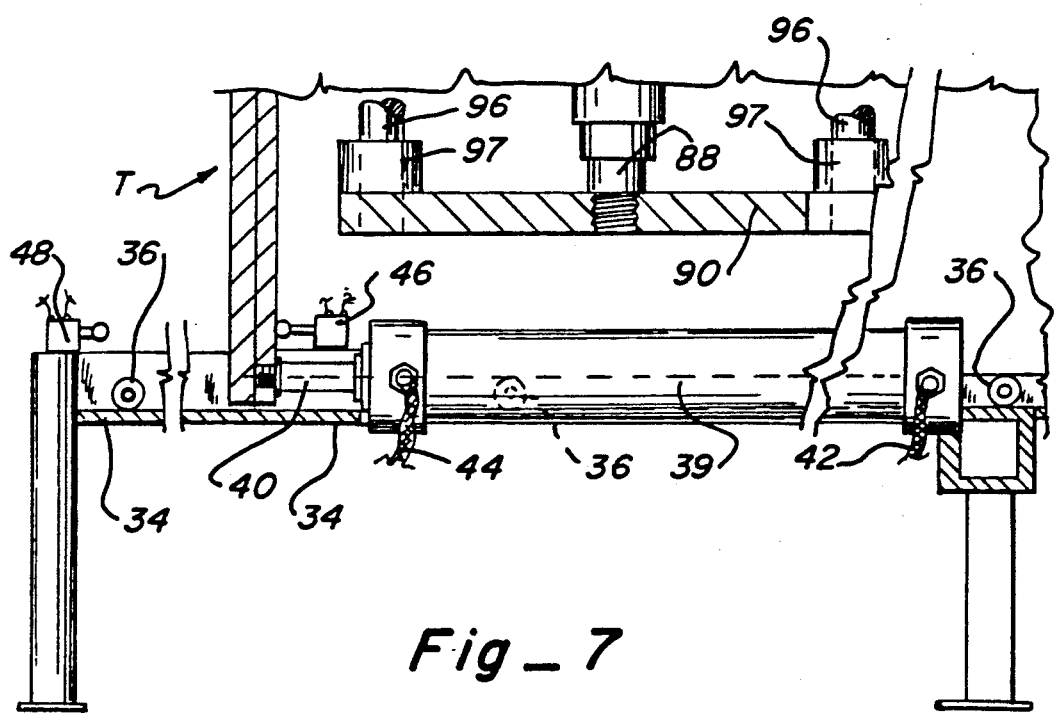
Fig_7

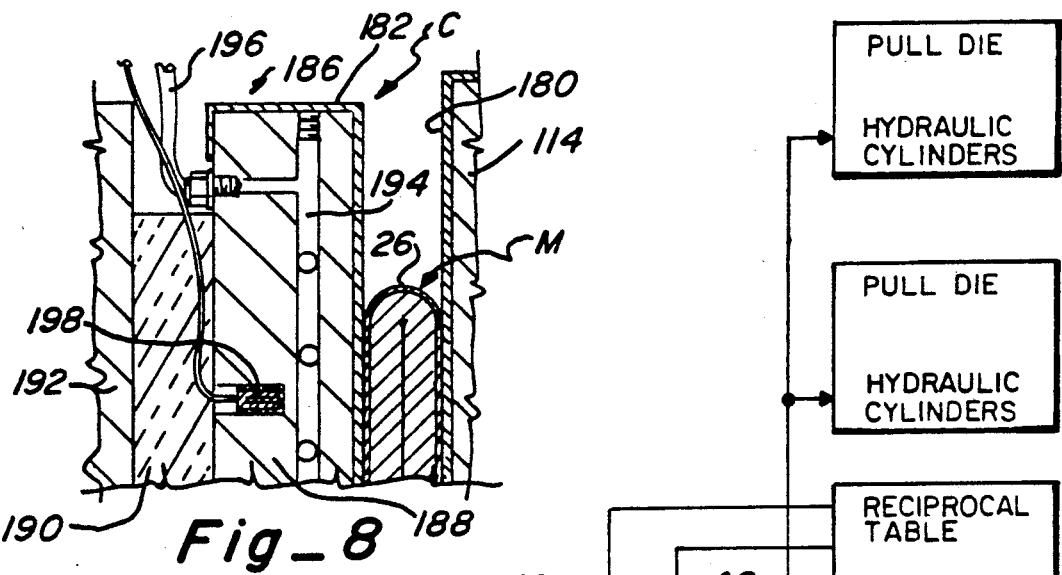
Fig_8
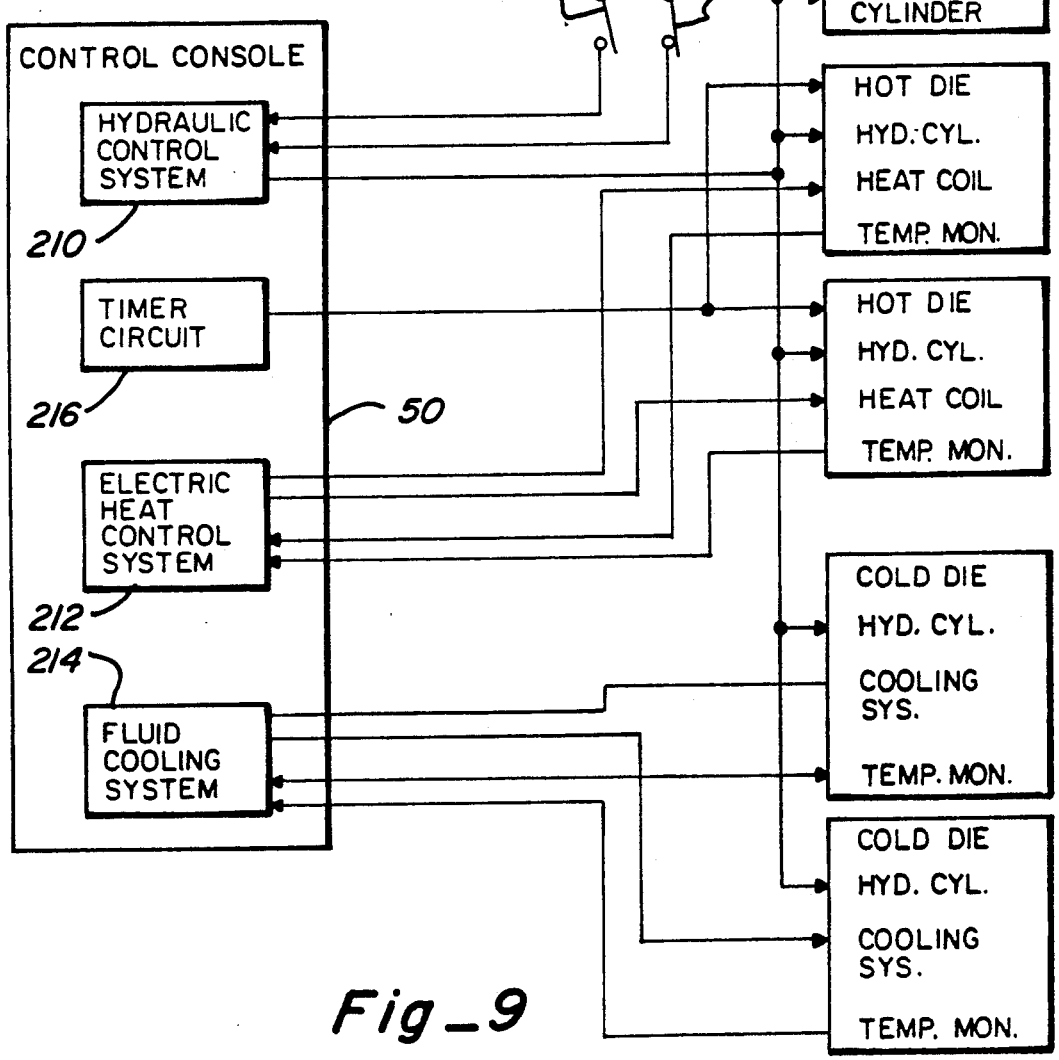
Fig_9

APPARATUS FOR CONTINUOUSLY FORMING COMPOSITE MATERIAL INTO A RIGID STRUCTURAL MEMBER

TECHNICAL FIELD

This invention relates to an apparatus and method for forming layers of composite material into a rigid structural member. More particularly, it relates to such an apparatus for forming a composite structural member on a continuous basis rather than one unit at a time.

BACKGROUND ART

Many advances have been made in the construction and utilization of composite materials for structural members. There is great interest in using such members in aircraft construction because of their great strength and light weight. However, a severe disadvantage is that prior to the present invention, such structures had to be fabricated individually for each airplane. In other words, each plane had to be constructed on a custom basis by hand since there was no automated process for making the composite structural members.

U.S. Pat. No. 4,512,837 to Sarh et al. discloses an apparatus for manufacturing a structural component, such as an aircraft wing, from a plurality of laminated fiber wound box frames made of fiber reinforced resin impregnated material.

U.S. Pat. No. 4,133,711 and U.S. Pat. No. 4,200,271, both to August et al., disclose a worx table assembly for composite laminate fed from rolls to a mold with a transfer gantry, a taping gantry and a cutting gantry.

U.S. Pat. No. 4,816,102 to Cavin et al. discloses a method and apparatus for forming elongated composite parts having constant cross-sections which is shaped by passing the composite material, such as graphite fiber cloth through a protrusion die.

Although each of the foregoing patents disclose devices and processes which are satisfactory for their intended purposes, none discloses a method or apparatus for making a composite structural member on a continuous basis.

DISCLOSURE OF THE INVENTION

The present invention contemplates a method of continuously forming a layered composite material into a rigid structure as the material is moved from an upstream location to a downstream location. The uncured layered composite material is pulled from a supply at the upstream location through a forming die to form the material into a structural member having a desired shape. The member is moved downstream into a heating die where it is at least partially cured. After it leaves the heating die it is cooled and continues to move downstream where it is cut into suitable lengths. The cooling can be accomplished by a cooling die located downstream from the heating die. A liner is provided within the dies having the same shape as the structural member through which the structural member slides as it moves in the downstream location. The movement of the structural member is incremental so that the portion which is within the heating die can remain there for a sufficient length of time to accomplish the desired curing.

More specifically, the apparatus for accomplishing the formation of the structural member includes a first clamping die downstream of the forming die, a second clamping die at a downstream location, a reciprocal table positioned between the first and second clamping dies and being movable between the first location adjacent the first clamping die and a second location adjacent the second clamping die. A pulling die is mounted on the table at the upstream end, the cooling die is mounted at the downstream end of the table and the heating die is mounted intermediate the pulling die and the cooling die. Means is provided for moving the reciprocal table from the first location to the second location and back again. A first die opening and closing means is provided for moving the pulling die, the heating die and the cooling die to closed position when the table is being moved from the first location to the second location to pull the material from the supply through the forming die to form it into the desired shape of the structural member. The first die opening and closing means opens the pulling die, the heating die and the cooling die when the reciprocal table moves from the second location to the first location to permit the structural member to slide through those dies.

A second die opening and closing means is provided for opening the first and second clamping dies when the reciprocal table is moved from the first location to the second location to allow the structural member to be pulled downstream and for closing the first and second clamping dies when the reciprocal table is moved from the second location to the first location to hold the structural member in fixed position as it slides through the pulling die, the heating die and the cooling die.

The apparatus can also include control means connected to each of the die means for opening and closing them in proper sequence and for timing the curing cycle. The heating die may have electrical heating elements therein to raise the temperature of the die to the proper temperature for curing the composite structural member. Similarly, the cooling die can be provided with cooling coils for lowering the temperature of the composite member after curing. Each of these dies is operated by hydraulic cylinders as is the reciprocal table. Conveniently, the reciprocal table is supported on a frame by means of rollers which allow the reciprocal movement.

By the use of the method and apparatus described, a composite structural member can be made on a continuous basis which, after curing, can be cut to appropriate lengths for use or further treatment.

Additional advantages of this invention will become apparent from the description which follows, taken in conjunction with the accompanying drawings.

BRIEF DESCRIPTION OF THE DRAWINGS

FIG. 1 is a fragmentary top plan view of the apparatus for continuously forming a composite structural member, with the control console omitted;

FIG. 2 is a fragmentary side elevation of the apparatus of FIG. 1;

FIG. 3 is an enlarged side elevation, taken along line 3—3 of FIG. 1, showing the reciprocating table and associated dies;

FIG. 4 is an enlarged top plan view of the dies, taken along line 4—4 of FIG. 3;

FIG. 5 is an enlarged vertical section, taken along line 5—5 of FIG. 3, showing the details of one of the heating dies;

FIG. 6 is an enlarged horizontal section showing the dies of FIG. 5 positioned against the structural member for curing it;

FIG. 7 is a fragmentary horizontal section, showing details of the mechanism for moving the reciprocal table;

FIG. 8 is an enlarged fragmentary view of a portion of a cooling die; and

FIG. 9 is a diagrammatical representation of the controls for the apparatus of FIGS. 1 and 2.

BEST MODE FOR CARRYING OUT THE INVENTION

In accordance with this invention, an apparatus is provided, as shown in FIGS. 1 and 2, for forming a structural member M from a plurality of composite layers 10 furnished from supply rolls 12 rotatably mounted at a supply station S. The supply rolls are uncured fiberglass mat material impregnated with graphite emulsion such as epoxy impregnated graphite unidirectional tape. These rolls are kept in a freezer prior to use to minimize the possibility of premature curing. Appropriate friction brakes 13 are provided so that the webs or layers 10 are held taunt as they are pulled from the rolls. The apparatus is usable for forming a variety of structural members. For illustrative purposes only, the structural member M shown in this application is an I-beam. However, it will be understood that other structural shapes, such as Z-shapes, channels, tees and crosses can be made. A different number of supply rolls 12 will be used depending upon the size, shape and thickness of the particular structural member being made. The orientation of rolls 12 with respect to centerline 16 will vary according to need.

The layers or webs 10 pass through a pair of pinch rollers 18 mounted on the upstream end of table 14. The material then passes through forming rollers 20, mounted on table 14 downstream of pinch rollers 18, which compress the composite web material to squeeze most of the air out of it. The formed member M then passes through a radius filler machine 22 from which a small twisted rope of composite filler material is fed into open crevices created where the webbing is folded back upon itself in the formation of the structural member M. This structural member then passes through a forming die F, located on table 14 downstream of forming rollers 20, which further compresses the material and forms it to the size and shape it will be when the manufacturing process has been completed.

Downstream from forming die F a casing dispensing tool 24 is mounted on table 14 through which the structural member passes. Tool 24 places a tubular casing material over the structural member to serve as a protective skin 26, shown in FIG. 8. The skin is telescoped over the tool 24 and fed onto the structural member as it passes through tool 24 like putting casing on a sausage. The tool is essentially a cylindrical sleeve and the material is disclosed in U.S. Pat. No. 3,836,425 assigned to the Ludlow Corporation and sold under the trademark "Tevlar". When the material liquidifies during the curing process, the protective skin keeps such material from leaking out onto the liners and the dies and stays on the product through the remainder of its manufacture.

Next, the structural member M passes through a clamping die D, mounted on the downstream end of fixed table 14, and into a pair of pulling dies P mounted on reciprocal table T.

During start up, the tapes from supply 12 are fed by hand through the apparatus just described. Once the leading end of the material is within pulling dies P, the material is pulled incrementally and continuously through the apparatus, as described below.

When pulling dies P are closed, and the reciprocal table T is moved from the right-hand or upstream position shown in FIG. 2, to the downstream location, the webbing 10 will be pulled from the supply rolls and pulled through the previously described rollers and forming die F, as well as through clamping die D at the downstream end of fixed table 14. Conveniently, table T moves downstream a distance equal to the width of two dies. While in the downstream position, pulling dies P are released and clamping die D at the downstream end of fixed table 14 is clamped down on the material. Then, table T moves to its upstream position whereupon the structural member T extends through a pair of heating dies H mounted at the center of reciprocal table T. At this point, the heating dies H and the pulling dies P are clamped down on the structural member M and clamping die D is released. When the table again reciprocates from the upstream position to the downstream position, more material is pulled from supply rolls 12 and formed into structural M as it passes through the upstream rollers and forming die F. While the heating dies are clamped down on the structural member M, they heat it to a sufficient temperature to cause partial or complete curing, depending on the end product desired. During the next cycle of the machine, the cured end of structural member M moves from a position within heating dies H to a position within cooling dies C mounted on the downstream end of reciprocal table T. The cooling dies reduce the temperature of the structural member to one at which it can be handled from further processing. Upon subsequent cycles of reciprocal table T, the downstream end of the structural member moves through clamping die D mounted on a stationary table 28. Conveniently, this clamping die operates in tandem with the clamping die at the downstream of fixed table 14 so as to hold the structural member in fixed position while reciprocal table T moves from the downstream location to the upstream location. While table T has been shown as supporting two pulling dies, two heating dies and two cooling dies, it should be understood that a greater or lesser number of dies may be provided for some applications. Also, for some situations the cooling dies could be omitted altogether.

After passing through clamping die D on table 28, the structural member M passes a saw 30 which cuts the structural member into appropriate lengths. The cut structural members are then placed on a conveyor 32 downstream of saw 30 where they are transported to an appropriate storage or shipping area.

As best seen in FIGS. 3, 5 and 7, reciprocal table T is mounted for movement back and forth across a frame 34. Table T has longitudinal rails 35 by which it is supported on spaced rollers 36. Lateral movement of table T is limited by rollers 37 mounted for rotation on vertical axes along members 38. Thus, rollers 37 ride along the inside surface of rails 35. Reciprocal table T is moved back and forth by means of a hydraulic cylinder 39 having one end fixedly connected to frame 34 and having a piston rod 40 connected to reciprocal table T. The cylinder is provided with hydraulic fluid through line 42 for extended the cylinder to move the reciprocal table in the downstream direction and through hydraulic line 44 to move the table in the upstream direction. When the table moves to the upstream location it will activate limit switch 46 to stop movement of the table, to cause clamping dies D to release and pulling dies P, heating dies H and cooling dies C to be closed. Similarly, when reciprocal table T reaches its downstream location, it will activate limit switch 48 to cause the movement of the table to cease and to cause clamping dies D to be closed and pulling dies P, heating dies H and cooling dies C to be released. These operations are controlled and timed through a programmable controller in control console 50, shown in FIGS. 2 and 9, and more fully discussed below. Conveniently all of the electrical lines and hydraulic lines come into console 50 so that the connections between console 50 and the dies are rigid, since they are all mounted on reciprocal table T and hence there is no relative movement between them.

Each of the sets of pulling dies, heating and cooling dies are identical except that the heating dies have heating elements and the cooling dies have cooling elements. The pulling dies have neither heating or cooling elements. The construction and operation of the dies will be described in connection with FIGS. 5 and 6 with respect to one of the heating dies H. It will be understood that the other dies will be of similar construction and have similar parts, except as noted.

Heating die H includes a lower platen 54 attached to the upper surface of reciprocal table T. Lower die component 56 is attached to lower platen, as by fastening means 58, which may be in the form of a threaded stud. The lower die component 56 includes center die element 60 and side die elements 62 and 64 which engage the web and flanges respectively of one side of structural member M. These die elements are provided with heating coils 66, 68 and 70, respectively. A temperature sensor 72 is provided in one of the die elements, such as center die 60 for sensing the temperature within the die so that it can be maintained at a suitable temperature for curing structural member M. Advantageously, the base 74 of lower die component 56 is surrounded by insulating material, such as a center insulating layer 76 and side insulating layer 78 and 80, respectively.

Conveniently, a large hydraulic cylinder 86 has one end attached to the bottom side of table 55 and has a piston rod 88 at the other end which is attached to a plate 90 that is movable up and down with the extension and contraction of piston rod 88. Fluid can be supplied to cylinder 86 through hydraulic lines 92 and 94, respectively. Posts 96 extend upwardly from sockets 97 on the four corners of plate 90, respectively, through respective sleeves 98 attached to the lower side of table surface 55. Grease fittings 99 are provided in sleeves 98 for lubricating the posts.

Upper platen 100 is supported near the upper end of posts 96. A plurality of vertically spaced openings 102 receive locking pins 104 extending through sleeves 106 on upper platen 100. Upper die component 110 is attached to upper platen 100 as by a fastening means 112, which may be a threaded stud. The upper die component is identical to the lower die component and includes a center die element 112 and side die elements 114 and 116 which engage the top side of the flange and webs of structural member M. These die elements include heating coils 118, 120 and 122, respectively. A temperature sensor 124 is provided in center die element 112 for controlling the temperature of the die. Thus, the positioning of the upper platen can be adjusted to accommodate different structural member shapes. By activating cylinder 86, the upper and lower dies can be closed or opened, as required, to form the final structural member. The heating coils and the heating dies will provide sufficient temperature to cure the structural member so that it becomes substantially rigid. Center insulating area 126 and side insulating layers 128 and 130, respectively, minimize heat transfer from the die elements to base 132.

Conveniently, opposed side die components are provided for forming the opposite ends of the structural member. A left side die element 134 is moved back and forth by piston rod 136 connected to hydraulic cylinder 138. The hydraulic cylinder 138 is mounted on the upper surface of lower platen 54 and is supplied with hydraulic fluid through hydraulic lines 140 and 142. Left side die element 134 includes a die 144, an insulating layer 146 and a base 148, as shown. Heating coils 150 and a temperature sensor 152 are provided within die 144.

Similarly, a right side die element 156 is provided connected to a piston rod 158 on a cylinder 160 supplied with hydraulic fluid through hydraulic lines 162 and 164. The right side die element includes a die 166, an insulating layer 168 and a base 170 connected to piston rod 158. The die 166 includes heating coils 172 and a temperature sensor 174. These side dies will be operated simultaneously to open or close against the ends of structural member M. For the manufacture of most structural members, a work window of 24" by 24" is sufficient. Maximum die pressures for pulling dies P can be on the order of 25 tons from the top and 7 tons each side. The heating and cooling dies will each have maximum die pressures on the order of 10 tons from the top and 5 tons from each side.

Conveniently, all of the dies on reciprocal table T are covered with liners or sleeves which run the full length of the table so that the surface of the dies never comes directly in contact with the surface of the structural member M. Thus, one purpose served by the liners is to prevent indentations or parting lines along the surface of the structural member. Referring to FIGS. 5 and 6, lower die element 56 is provided with an exterior liner 178 which extends around the outer periphery of dies 60, 62 and 64, respectively. Similarly, upper die component 110 is provided with a liner 180 which extends around the outer peripheral edge of die elements 112, 114 and 116, respectively. Likewise, left side die element 134 is provided with a liner 182 which extends around the outer periphery of die 144. Finally, right side die element is provided with a liner 184 which extends around the outer periphery of die 166. If uncured material should gum up one of the liners, it can be removed and replaced with a new one in such a short period of time that manufacture of the structural member is scarcely interrupted. This liner can be made of any suitable material, such as stainless steel or aluminum.

These liners are also used to control "spring back" of the structural member when the dies are released. Spring back is the tendency of the material to return to its preformed condition. Thus, a right angle turn in the liner might be made at 93° to accommodate spring back in the material to give a finished angle of 90°. Any changes in angles can be made by removing the liners and making changes in them on a milling machine. Thus, small adjustments can be made by modifying the relatively inexpensive liners rather than the expensive dies.

A detail of a cooling die C is shown in FIG. 8 wherein the left side die component 186 is illustrated which includes a die 188, an insulating layer 190 and a base 192. The die 188 has cooling coils 194 to which a coolant, such as water, is supplied through an inlet tube 196. A temperature sensor 198 is also provided in die 188. The other die components of cooling die C are similarly constructed.

As best seen in FIG. 9, control console 50 includes a hydraulic control system 210, an electric heat control system 212 and a fluid control system 214. The hydraulic control system 210 is connected to the hydraulic cylinders in the pulling dies P, the heating dies H and the cooling dies C, as shown. Hydraulic control system 210 also controls the hydraulic fluid to the hydraulic cylinder 39 of reciprocal table T and is responsive to the closure of switches 46 and 48. The electrical heat control system provides current to the heating coils of the heating dies H and receives signals from the temperature monitors within each die for controlling the heat. Similarly, the fluid control system 214 provides cooling fluid to the cooling coils of the cooling dies C and receives temperature signals from the temperature sensors for adjusting the temperature and flow of the coolant.

A timer circuit 216 controls the length of time the hot dies H are closed to effect the appropriate curing time. When the die reaches the appropriate curing temperature, the timer circuit will be activated to hold the dies in closed position for the appropriate curing time period. When this period of time has passed, the timer circuit will shut-off and the heating dies, along with the pulling dies and cooling dies will open. Of course, at least a portion of this curing period can occur as the reciprocal table moves from the upstream location to the downstream location. Typically, this movement will occur at a speed of one foot per minute. Thus, a four foot table movement will require four minutes. Some materials set immediately upon reaching a given temperature. If that type of material is used, the curing time is less critical.

A lay up and process for making an I-beam which is typical for the apparatus of this invention will be discussed. This process is for the lay up of an I-beam having a web height of 7.21" and wherein one flange is 2.50" wide and the other flange is 3.00" wide. The thickness of the web and the shorter flange is 0.180" and the thickness of the longer flange is 0.210". The web comprises six layers of epoxy impregnated graphite unidirectional tape wherein the two innermost layers and the outside layer is of PX/PW grade and the intermediate layer is of PX/O grade. These layers form the web and the bottom portion of each of the flanges. The shorter flange has three additional top layers of PX/PW grade epoxy impregnated graphite unidirectional tape and the wider flange has four additional layers of the PX/PW epoxy impregnated graphite unidirectional tape. A filler material is used in the gap formed at the intersection of the web and the flanges. It is epoxy impregnated graphite unidirectional tape which has been rolled into a rope or coil. To cure this material to a "C" stage, i.e., 30% cure of a 100% final full cure, the heating dies must be heated to 325° F. for a period of three minutes.

From the foregoing, the advantages of this invention are readily apparent. A device has been provided wherein fiberglass composite materials can be pulled from spools through forming rollers and dies to form them into a desired shape for a structural member. The structural member can be pulled through a series of pulling dies, hot dies and cooling dies mounted on a reciprocal table. Each of these dies has a common liner that extends from an upstream end to a downstream end thereof which engages the surface of the material and prevents any indentations or markings on the sides of the material from the dies. After curing, the structural member can be cut to any desired length. The curing can be completely accomplished in this apparatus or a partial cure can be undertaken whereby the formed structural member can be further cured on the site or at a later time when other procedures are being preformed on the structural member.

This invention has been described in detail with reference to a particular embodiment thereof, but it will be understood that various other modifications can be effected within the spirit and scope of this invention.

I claim:

1. Apparatus for continuously forming layered composite material into a rigid structural member as the material is moved along a centerline from an upstream location to a downstream location, said apparatus comprising:
   a supply of layered composite material at an upstream location;
   a forming die downstream of said supply along said centerline for pressing the material into a structural member of desired shape;
   a first clamping die means downstream of said forming die along said centerline movable between open and closed positions;
   a second clamping die means at a downstream location along said centerline movable between open and closed positions;
   a reciprocal table, having an upstream end and a downstream end, positioned between said first and second clamping die means and being movable between a first location adjacent said first clamping die means and a second location adjacent said second clamping die means;
   a pull die means mounted on said table at said upstream end thereof along said centerline movable between open and closed positions;
   a cooling die means mounted on said table at said downstream end thereof along said centerline movable between open and closed positions;
   a heating die means mounted on said table intermediate said pull die means and said cooling die means along said centerline movable between open and closed positions;
   means for moving said reciprocal table from said first location to said second location and back again;
   first die opening and closing means for moving said pulling die means, said heating die means and said cooling die means to closed position and holding them in closed position when said table is being moved from said first location to said second location to pull the material from said supply through said forming die to form it into the desired shape of the structural member and for opening said pulling die means, said heating die means and said cooling die means and holding them in open position when said reciprocal table is moved from said second position to said first position; and
   second die opening and closing means for opening said first and second clamping die means while said reciprocal table is moved from said first location to said second location and for closing said first and second clamping die means while said reciprocal table is moved from said second location to said first location to hold the structural member in fixed position.

2. Apparatus, as claimed in claim 1, further including:
a liner extending through said pulling die means, said heating die means and said cooling die means, having the same shape as the structural member to prevent seams or indentations from being formed on the structural member by the die means.

3. Apparatus, as claimed in claim 1, further including:
means between said forming die means and said first clamping die means along said centerline for placing a protective skin over the structural member.

4. Apparatus, as claimed in claim 1, further including:
control means connected to each of said die means for opening and closing them in proper sequence.

5. Apparatus, as claimed in claim 1, wherein:
said second clamping die means, said pulling die means, said heating die means and said cooling die means each includes two side-by-side dies.

6. Apparatus, as claimed in claim 5, wherein:
each of said dies is of equal width and said movement of said reciprocal table from said first location to said second location is equal to the width of two dies.

7. Apparatus, as claimed in claim 1, further includes:
cutting means located downstream of said second claiming die means for cutting the structural member into lengths.

8. Apparatus, as claimed in claim 1, wherein said reciprocal table moving means comprises:
a frame for mounting said reciprocal table;
rollers attached to said frame supporting said reciprocal table for movement across said frame between said first location and said second location; and
a reciprocal cylinder having one end connected to said frame and the other end connected to said reciprocal table for moving said reciprocal table between said first location and said second location.

9. Apparatus, as claimed in claim 1, wherein each of said die means comprises:
a lower platen supporting a lower die component;
an upper platen supporting an upper die component vertically movable with respect to said lower platen;
hydraulic cylinder means, having upper and lower ends, connected to said upper platen for moving it with respect to said lower platen;
a first side platen supporting a first side die component;
a first side hydraulic cylinder means connected to said first side component for moving it inwardly against the structural member or outwardly away from the structural member;
a second side platen supporting a second side die component in opposed relationship to said first side die component; and
a second side hydraulic cylinder means connected to said second side component for moving it inwardly against the structural member or outwardly away from the structural member.

10. Apparatus, as claimed in claim 9, wherein said upper end of said hydraulic cylinder means is connected to the lower side of said lower platen and extends downwardly therefrom, said apparatus further including:
a rectangular plate attached to said lower end of said hydraulic cylinder; and
a rod extending upwardly from each corner of said lower plate through respective openings in said lower platen, the upper end of each of said rods being connected to a corner of said upper platen to move it up and down in response to movement of said hydraulic cylinder means.

11. Apparatus, as claimed in claim 9, wherein:
said heating die means includes heating elements in each of said die components; and
said cooling die means includes cooling elements in each of said die components.

12. Apparatus, as claimed in claim 11, further including:
first temperature sensing means in each of said die components of said heating die means; and
second temperature sensing means in each of said die components of said cooling die means.

* * * * *

UNITED STATES PATENT AND TRADEMARK OFFICE
CERTIFICATE OF CORRECTION

PATENT NO. : 5,127,980
DATED     : July 7, 1992
INVENTOR(S) : Michael G. Cavin

It is certified that error appears in the above-identified patent and that said Letters Patent is hereby corrected as shown below:

Column 9, Line 32, after "frame" insert --for--.

Signed and Sealed this

Seventh Day of September, 1993

Attest:

BRUCE LEHMAN

Attesting Officer      Commissioner of Patents and Trademarks